UNITED STATES PATENT OFFICE.

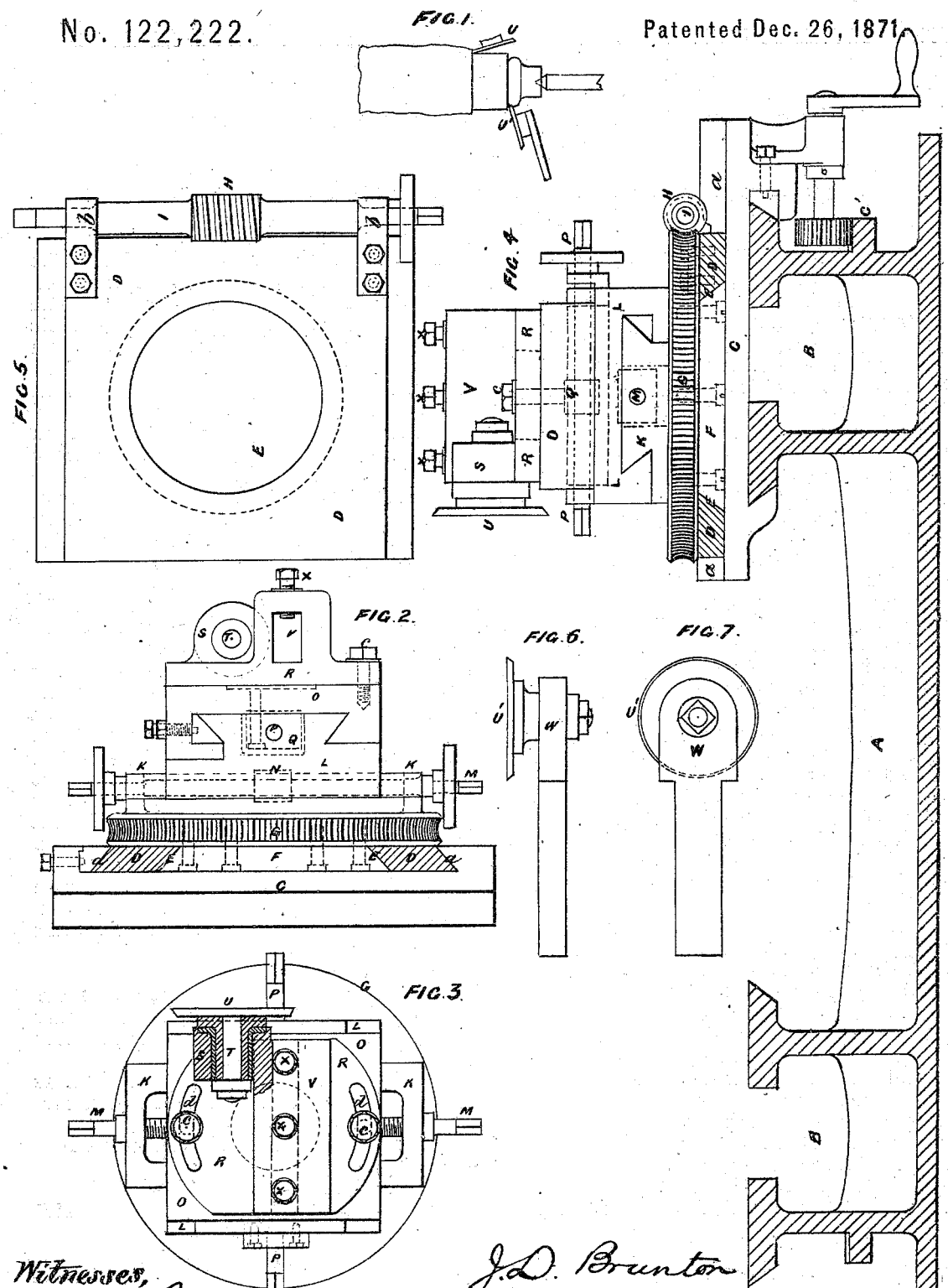

JOHN DICKINSON BRUNTON, OF LEIGHTON CRESCENT, KENTISH TOWN, ENGLAND.

IMPROVEMENT IN MACHINES FOR TURNING STONE.

Specification forming part of Letters Patent No. 122,222, dated December 26, 1871.

I, JOHN DICKINSON BRUNTON, of Leighton Crescent, Kentish Town, in the county of Middlesex, England, civil engineer, have invented Improvements in Turning and Shaping Stone, of which the following is a specification:

This invention consists in the application and use to and in the turning and shaping of stone, of slide-rests carrying rotatory discoidal cutters, and capable of receiving a rectilinear and circular motion, for the purpose of turning the stone to any required figure.

Figure 1 of the drawing is a diagram showing the mode in which I cause discoidal rotatory cutters to attack a block of stone while in the lathe. Fig. 2 is an end elevation, and Fig. 3 a corresponding plan of one of the adjustable slide-rests for carrying the circular revolving cutter. Fig. 4 is a side elevation of one of the slide rests in its place upon the lathe-bed. Fig. 5 is a detail plan of a portion of the slide rest; and Figs. 6 and 7 are details of one of the tools or cutters and its holder detached.

A is the lathe-bed having an additional bed, B B, on each side for carrying the slide-rests which hold the cutters. One of these slide-rests is fitted onto each of the beds B B, so that their respective cutters may operate simultaneously on opposite sides of the block of stone to be turned, as shown in the diagram, Fig. 1. C is the base plate of the slide-rest, which is capable of adjustment along the bed B by a rack-and-pinion motion, as shown at C', and may be fixed in any desired position by the ordinary clamp, which I have not shown in my drawing. Upon the surface of the plate C parallel dovetail guides $a$ $a$ are fitted or formed transversely in the lathe-bed B, and between these guides slides the rectangular plate D, shown in detached plan at Fig. 5, which plate has a circular dovetailed opening, E, made therein for the reception of the corresponding beveled-edge disk F, which is screwed to the under side of the worm-wheel G, thus enabling the worm-wheel and all it carries to revolve on a vertical axis when actuated by the worm H, fast on the spindle I, which is carried in bearing $b$ $b$ on the plate D, Fig. 5. To the upper surface of the worm-wheel G there is secured the male dovetail K, along which slides the plate L, by the action of the screw-spindle M and nut N, the latter being secured to the plate L. On the top of the plate L there is formed another male dovetail at right angles to the one last referred to, and along this slides the plate O by the action of a second screw-spindle, P, and nut Q, secured to such plate, and on the surface of the plate O rests the circular plate R, which is held down there by two bolts, $c$ $c$, passing through curved slots $d$ $d$, Fig. 3, in the plate R to allow of a certain amount of circular adjustment with a view to the adjustment of the angular position of the cutter. A socket, S, is formed upon the surface of the plate R for the reception of the spindle or axis T of the circular cutter U, the axis of the cutter revolving freely in the socket S, by its contact with the surface of the revolving block of stone, which is supported in the well-known manner between two head-stocks. V is a second socket, into which the shank of the holder W, carrying a discoidal cutter, U', Figs. 6 and 7, is inserted and held secure by the set-screws X, the object of such cutter U' being to cut the ends or faces and moldings, as shown in Fig. 1, while the opposite cutter U acts as the roughing-tool upon the curved or cylindrical surface of the block. The cutters must be adjusted at a suitable angle to the work, and they derive their rotatory motion from their forcible contact with the stone itself.

I claim as my invention—

The combination, with a slide-rest, of a discoidal cutter, which may be adjusted, and when brought in contact with a moving block of stone will reduce or shape the latter, as set forth.

In testimony whereof I have signed my name to this specification in the presence of two subscribing witnesses.

JOHN DICKINSON BRUNTON.

Witnesses:
FRED. WALKSEN,
CHAS. MILLS.

(153)